United States Patent [19]

Fox et al.

[11] Patent Number: 4,635,047
[45] Date of Patent: Jan. 6, 1987

[54] AIR SYSTEM MONITOR FOR A COTTON HARVESTER

[75] Inventors: Robert E. Fox, Minburn; Bruce L. Hubbard, Ankeny, both of Iowa

[73] Assignee: Deere & Company, Moline, Ill.

[21] Appl. No.: 861,101

[22] Filed: May 5, 1986

Related U.S. Application Data

[63] Continuation of Ser. No. 644,485, Aug. 27, 1984, abandoned.

[51] Int. Cl.⁴ ............................................. G08B 21/00
[52] U.S. Cl. ...................................... 340/684; 340/608; 340/611; 56/10.2; 56/30
[58] Field of Search ..................... 340/684, 611, 608; 116/70; 56/10.2, 30, 12.9, 13.2

[56] References Cited

U.S. PATENT DOCUMENTS 2,698,929  1/1955  Greacen, III, et al. .............. 340/608

Primary Examiner—Glen R. Swann, III

[57] ABSTRACT

An element placed within a cotton conveying duct of a cotton harvester above the air discharge jet is shaped to shed cotton and supports a vacuum opening which communicates with a simple differential pressure switch through a vacuum conduit. The aspiration effect of normal air flow over the opening provides a vacuum in the conduit which maintains the switch open, but if air velocity in the duct drops below a preselected value due to a plug, low fan speed or faulty hose, the vacuum decreases and the switch closes to energize a warning device.

21 Claims, 4 Drawing Figures

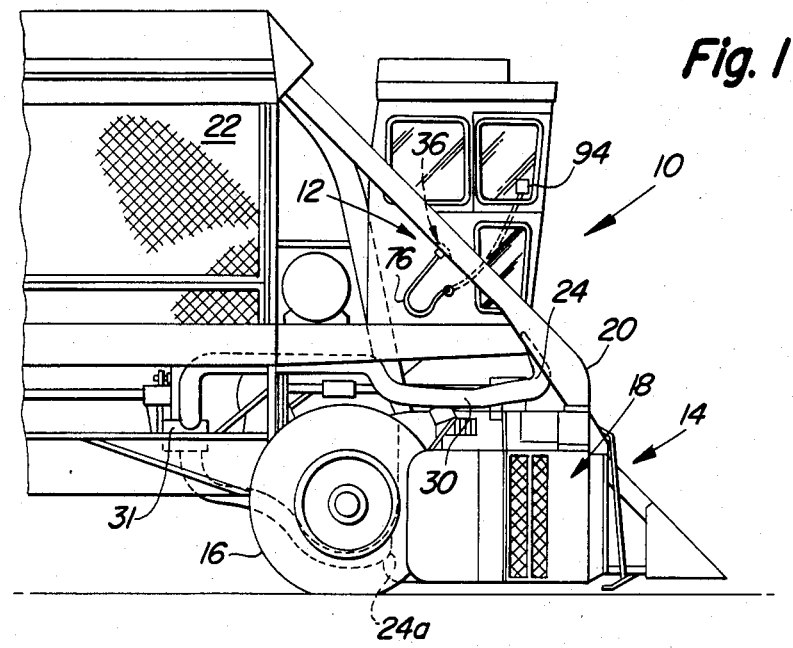
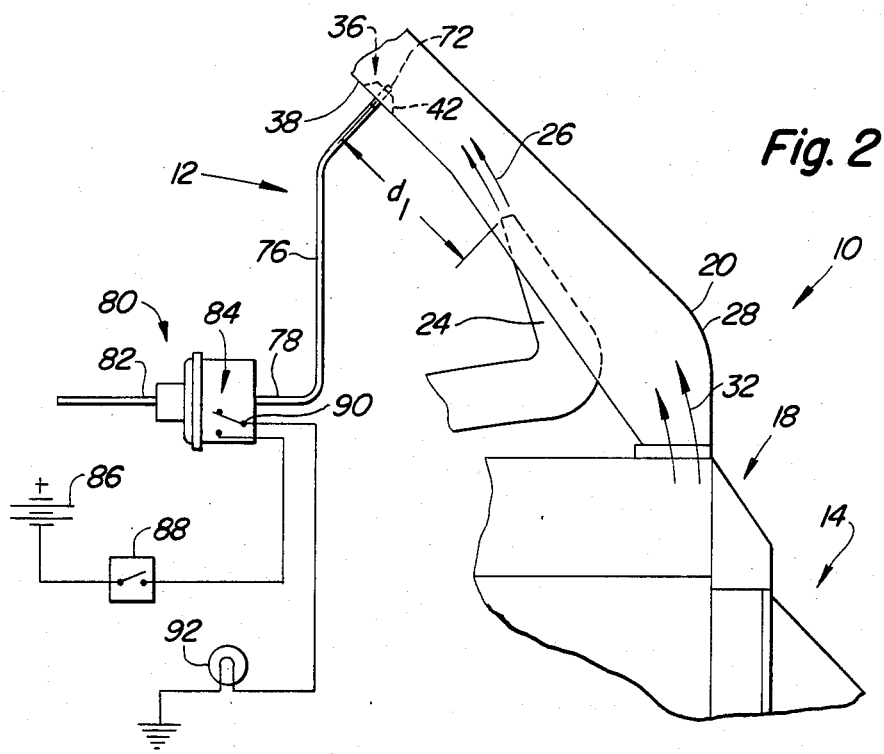

AIR SYSTEM MONITOR FOR A COTTON HARVESTER

This application is a continuation of application Ser. No. 644,485 filed Aug. 27, 1984, now abandoned.

Background of the Invention

The present invention relates to a monitor for a cotton harvester and, more specifically, to a monitor for providing a warning when a problem occurs in the cotton conveying system of the harvester.

Various types of monitoring systems have been devised to detect blockages in cotton harvesters which have air conveying systems for moving harvested cotton from the row units to a cotton receptacle. A typical air system for such a harvester includes an upwardly directed duct and a fan which provides a jet of air downstream of the row unit to suck the cotton from the unit and propel it to the receptacle. A monitor such as shown in U.S. Pat. No. 3,863,428 issued to Robert L. Baxter detects a change in vacuum upstream of the jet to provide a corresponding change in an electrical signal which, in turn, is processed in a special electrical comparison circuit to actuate an alarm. Although such a monitor is effective to detect a blockage occurring upstream of the jet, blockages above the jet closer to the receptacle can go undetected, as can problems associated with the fan or distribution hoses. In addition, the monitor is relatively complicated and expensive and requires rather precise calibration to work effectively without false alarms. Other types of monitors have also utilized one or more pressure measurements within the air system, but these have generally required microprocessors or other expensive or difficult to calibrate circuitry and have not been totally effective in detecting problems other than blockages in specific areas of the air system. Thermistors and thermocouples to sense air flow in a duct, such as shown in U.S. Pat. No. 4,068,223, are available but are also quite sensitive and require relatively complex circuitry which must be carefully calibrated. Other types of sensors including photoelectric detectors responsive to cotton flow have been devised but generally are too susceptible to being rendered inoperative by dirt and sap present in the duct.

SUMMARY OF THE INVENTION

It is therefore an object of the present invention to provide an improved monitor for an air system on a cotton harvester. It is a further object to provide such a monitor which is simpler, less expensive, more reliable and yet more inclusive in the number and types of air system problems that can be detected than at least most of the previously available monitors. It is still another object to provide such a monitor which requires little calibration and no elaborate electronics.

It is yet another object of the invention to provide an air system monitor for a cotton harvester which obviates highly sensitive transducer elements and complicated comparison circuitry. It is another object to provide such a monitor which relies directly on changes in air flow through the conveying duct, rather than on pressure or changes in pressure in the system, to detect problems within the system.

It is still a further object to provide a relatively simple and inexpensive monitor for a cotton harvester which is self-checking on start-up of the harvester. It is a further object to provide such a monitor having an alarm which turns off upon the total air flow in a selected portion of the conveying duct reaching a preselected level.

It is still another object of the invention to provide a monitor for a cotton harvester air system with an air flow measuring device which fits within the cotton conveying duct without catching cotton or obstructing the flow of cotton and which is relatively simple, has no moving parts and is not easily rendered inoperative by dirt and sap.

The monitor includes an air flow sensing element located in the lower wall of the cotton conveying duct above or downstream of the air jet. The element includes a sloped cotton-deflecting portion diverging in the downstream direction into the cotton path from the duct wall. A hose barb is located near the downstream end of the sloped portion and communicates with a vacuum opening which projects upwardly adjacent the downstream end so that when there is a flow of air over the opening, an aspiration effect caused by the flow produces a vacuum in the barb. A conduit connects the barb with the low input side of a simple on-off vacuum switch, and the high input side of the switch is open to atmosphere. The switch is connected to a warning device such as an indicator light or horn on the instrument panel of the cotton harvester. As long as the air flow in the duct is above a preselected value, the vacuum switch remains off. However, if a problem occurs such as a plugged duct or harvesting unit, a slow fan caused by low engine speed or a faulty belt, or disconnected or faulty hoses, the vacuum switch immediately turns the warning device on to alert the operator. The warning device comes on as a check of the monitor upon initial start-up of the harvester until the fan speed increases to a point where air flow in the duct is above the preselected value.

The element is shaped to extend the vacuum opening sufficiently into the air flow region in the duct to provide optimum vacuum at the barb during normal operation while at the same time efficiently shedding cotton and debris. The element is located sufficiently downstream from the air jet location so that the vacuum signal at the barb provides a good indication of the total air flow in the duct and not just air jet flow. Elaborate and expensive sensing and comparison devices are obviated, and more types of problems, including blockages both upstream and downstream of the air jet, are detectable.

These and other objects, features and advantages of the present invention will become apparent to those skilled in the art from the description which follows and from the drawings.

BRIEF DESCRIPTION OF THE DRAWINGS

FIG. 1 is a side view of the front portion of a cotton harvester with the monitor of the present invention attached thereto.

FIG. 2 is a view of a portion of the harvester of FIG. 1 and showing schematically further details of the monitor.

DESCRIPTION OF THE PREFERRED EMBODIMENT

Figure 3:
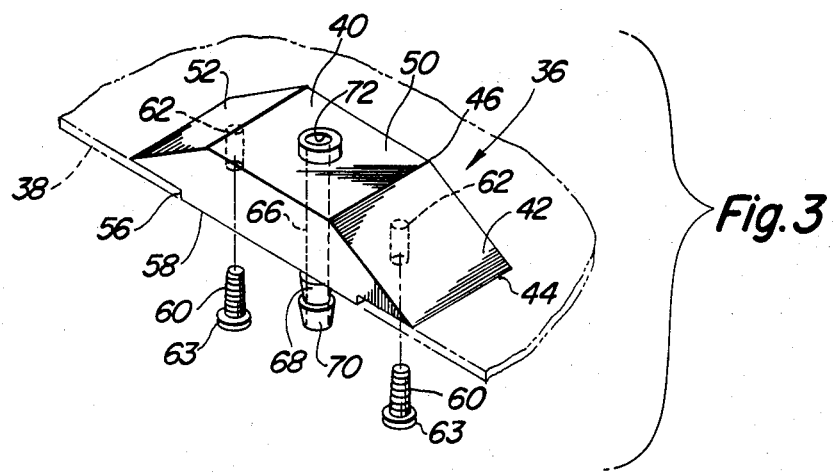
FIG. 3 is an exploded view of the venturi element utilized with the monitor of FIG. 2.

Referring now to FIGS. 1 and 2, therein is shown a cotton harvester 10 of conventional construction and having an air system monitor 12 attached thereto. The cotton harvester 10 includes a plurality of transversely spaced row units 14 for removing cotton from plants as the harvester moves forwardly over the field on wheels 16. The row units 14 include door assemblies 18 for receiving harvested cotton from the doffers (not shown). A cotton conveying duct 20 is connected to the upper portion of the door assembly 18 and extends upwardly and rearwardly to a cotton-receiving receptacle 22. A conventional air nozzle 24 or other device for introducing a jet of air 26 into the cotton conveying duct 20 is supported by the duct above the door assembly 18 adjacent a bend location 28. The nozzle 24 is connected via a flexible air hose 30 to a source of air flow 31, preferably an engine-driven fan, which also is of conventional construction. The nozzle 24 introduces the jet of air 26 in the downstream direction (upwardly) within the duct 20 and produces a suction effect in the upstream area of the duct to suck the cotton from the door 18. The cotton sucked from the door 18 is then propelled upwardly and rearwardly into the receptacle 22. Total air flow in the duct 20 above or downstream of the air nozzle 24 is therefore a combination of the air flow 26 provided by the nozzle 24 and the additional air, indicated generally at 32, sucked from the door assembly 18.

The monitor 12 includes a combination deflector and air flow sensing element 36 which is adapted to be secured within a lower wall 38 of the duct 20 a substantial distance ($d_1$) above or downstream of the nozzle 24. The element 36 includes a body 40 (FIG. 3) having an inclined wall 42 which slopes inwardly from the lower wall 38 of the duct 20 into the cotton conveying path of the duct 20 in the downstream direction. The surface 42 includes an upstream end 44 which is substantially flush with the inside surface of the wall 38. The inclined surface 42 has a relatively gentle slope, preferably about thirty degrees from the plane of the lower wall 38, so that cotton and debris will easily shed from the element 36. The inclined surface 42 terminates in a downstream location 46 which in the preferred embodiment is approximately one-half inch inwardly of (above) the inside surface of the lower wall 38 of the duct.

The element 36 includes a flattened top portion 50 which extends in the downstream direction from the location 46 generally parallel to the lower wall 38. The element 36 preferably is symmetrical and includes a rear inclined wall or surface 52 of identical slope to that of the surface 42. The lower portions of the body 40 below the upstream end of the inclined surface 42 and the downstream end of the inclined surface 52 lie substantially in a plane so that they fit flush against the inside surface of the wall 38. The wall 38 is provided with a rectangularly-shaped aperture 56 which receives a mating projection 58 at the lower portion of the body 40 which maintains the inclined surface 42 in the desired attitude. Self-tapping fasteners 60 are threaded into apertures 62 of the element 36 and include heads 63 which bear against the outer surface of the lower wall 38 adjacent the aperture 56 to maintain the element 36 in the cotton conveying duct 20. Other suitable attaching means, such as resilient clips molded integrally with the element 36 for engaging the wall 38, may also be utilized. The element 36 is symmetrical so that the inclined surface 52 can be turned upstream to act as the cotton-deflecting portion if the surface 42 becomes worn or otherwise damaged.

The element 36 includes a central aperture 66 which receives a hose barb insert 68 therein. Alternatively, the hose barb insert 68 can be molded as an integral portion of the entire element 36 which preferably is fabricated from a wear-resistant plastic. The hose barb 68 includes a conduit receiving end 70, which when the element 36 is attached to the duct 20, extends downwardly below the lower wall 38 of the duct. The barb 68 includes a rimmed upper end or vacuum opening 72 which preferably is centered with respect to, and projects slightly above, the top portion 50 of the body 40 adjacent the downstream end 46 of the inclined surface 42. During operation, air flowing over the opening 72 of the barb 68 produces an aspiration effect within the barb. The aspiration effect provided at the opening 72 is dependent upon the total air flow through the duct which is a combination of both the air 26 provided through the air nozzle 24 and the additional air 32 induced by the action of the air nozzle 24. The distance $d_1$ is made large enough, preferably on the order of two feet, to prevent the aspiration effect from depending substantially entirely on the flow of air from the nozzle 24. It has been found that by projecting the opening 72 on the order of one-half inch above the duct wall 38 and slightly above the top portion 50 that a very efficient and non-clogging vacuum-producing element is provided.

In the preferred embodiment, the element 36 is approximately 2.2 inches in length and three-fourths of an inch in width. The top portion 50 is approximately three-eighths to one-half inch above the inside surface of the lower wall 38 and the opening 72 of the hose barb insert 68 extends approximately 0.06 inch above the top 50. The rim of the opening 72 terminates substantially in a plane generally parallel to the top 50. The element 36 efficiently sheds cotton and debris while providing a pressure differential in the conduit 76 of greater than two inches of water between an open duct operating condition and a closed duct clogged condition. The element 36 may be easily inserted through the aperture 56 for convenient installation; existing ducts may be retrofitted with the element 36 simply by cutting a rectangular hole at the proper location in the duct.

A vacuum conduit 76 is connected to the end 70 of the hose barb 68 and to a low input port 78 of a simple on-off differential pressure switch 80. The high input port 82 of the differential pressure switch 80 is open to atmosphere. The differential pressure switch 80 is of conventional construction and includes a diaphragm-actuated single-pole double-throw snap switch 84 which is connected so that the switch is in the normally closed position. The snap switch 84 is connected to a source of voltage 86 through the ignition switch 88 of the harvester 10. The switch 84 includes an output terminal 90 connected to a warning light or other indicating device 92 located on the instrument panel of cab 94 on the harvester 10.

During normal operation, the flow of air over the opening 72 of the element 36 produces a vacuum in the hose barb insert 68 which is communicated to the low input port 78 of the differential pressure switch 80 by the vacuum conduit 76. As long as total air flow in the duct 20 is above a preselected level, the vacuum in the conduit 76 will be sufficient to maintain the differential pressure switch 80 in the off condition, that is, with the snap switch 84 in the open condition as shown in FIG. 2. However, if a problem develops in the air system such that the flow of air through the duct 20 decreases below the preselected level, the vacuum in the conduit 76 will correspondingly decrease to a level wherein the diaphragm of the switch 80 moves the snap switch 84 to the closed position to activate the device 92 on the control panel and warn the operator of the problem.

Figure 4:
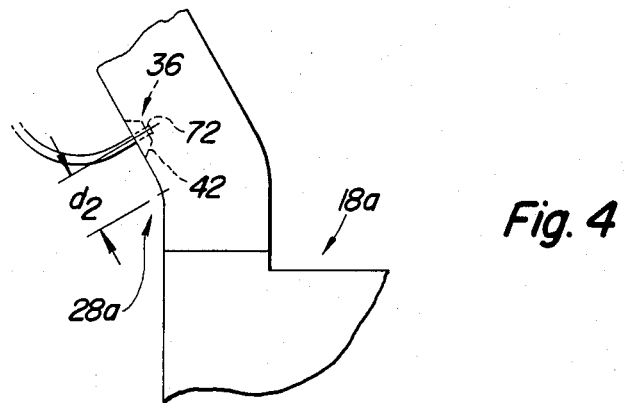
FIG. 4 is a side view of another portion of the cotton harvester air conveying system having a jet located in the lower portion of the door assembly and showing the relative location of the venturi element with respect to a bend location in the duct.

In the alternate embodiment of FIG. 4, wherein the air nozzle 24a (FIG. 1) is located at the lower portion of the rear of the door assembly 18a, the preferred location of the element 36 is closely adjacent but slightly downstream (d₂) of the inside or lower bend location 28a. Preferably the element 36 is located less than two inches from the bend location 28a. It has been found that locating the venturi opening 72 adjacent a portion of the duct where a change in direction of the flow of air and cotton occurs provides an optimum aspiration effect while reducing the amount of cotton and debris which directly impinge against the sensing element 36.

Having described the preferred embodiment, it will be apparent that modifications can be made without departing from the scope of the invention as defined in the accompanying claims.

We claim:

1. In a cotton harvester having a row unit for removing cotton from plants, a receptacle for receiving harvested cotton, a walled duct extending between the row unit and the receptacle, and an air jet for introducing air into the duct downstream of the row unit to suck cotton from the unit and propel the cotton through the duct downstream to the receptacle, a monitor comprising:
   aspirator means positioned at a preselected location in the duct for providing a vacuum signal dependent upon the velocity of the air in the duct at said preselected location, said aspirator means including a conduit portion terminating in an aperture projecting into the duct and wherein said vacuum signal is produced by air flow over the aperture;
   a vacuum switch connected to the aspirator means and responsive to the vacuum signal, said switch having a first state when the vacuum signal corresponds to an air flow above a preselected velocity and a second state when the flow is below said preselected velocity; and
   an indicator connected to the vacuum switch for providing an indication of the state of the switch.

2. The invention as set forth in claim 1 further comprising deflecting means including a surface sloping inwardly into the duct in the downstream direction, said aperture located adjacent and downstream of the sloped surface, said monitor further comprising a conduit connecting the aperture with the vacuum switch.

3. The invention as set forth in claim 2 wherein the aspirator means and deflecting means are fabricated as a single element, said element including:
   an upper flattened surface projecting above and generally parallel to a wall of the duct in the downstream direction from the sloped surface; and
   a hose barb located generally downstream of the sloped surface and including a conduit-receiving portion in communication with the aperture, said aperture defined within a rim portion projecting into the duct upwardly from the flattened surface.

4. The invention as set forth in claim 2 wherein the deflecting means is supported in the duct downstream of the air jet location.

5. The invention as set forth in claim 1 wherein the duct includes a bend location downstream of the air jet location and the aspirator means is located adjacent but slightly downstream of the bend location.

6. The invention as set forth in claim 1 wherein the vacuum switch includes a diaphragm having one side open to the atmosphere and the opposite side connected to the aspirator means for receiving the vacuum signal.

7. In a cotton harvester having a row unit for removing cotton from plants, a receptacle for receiving harvested cotton, a walled duct extending between the row unit and the receptacle, and an air jet for introducing air into the duct at a location downstream of the row unit to suck cotton from the unit and provide an air flow in the duct to propel the cotton through the duct downstream to the receptacle, a monitor comprising:
   a cotton-deflecting surface located within the duct in an area of positive pressure with respect to atmosphere downstream of the air jet;
   means measuring the aspiration effect of the air flow adjacent the cotton-deflecting surface to provide a signal indicative of the total air flow in the duct, said cotton-deflecting surface limiting direct impingement of the cotton on the means measuring; and
   alarm means responsive to the air flow signal for providing a warning when the indicated air flow is below a preselected value.

8. The invention as set forth in claim 7 wherein the means measuring comprises a vacuum switch having a high input side open to atmosphere and a low input side, a vacuum conduit having one end connected to the low input side and an opposite end connected adjacent the downstream end of the cotton-deflecting surface and opening into the duct.

9. The invention as set forth in claim 8 wherein the vacuum switch has a normally on condition when the pressure at the low input side is at atmosphere or above, said switch changing to an off condition upon the occurrence of a preselected vacuum at the low input side.

10. The invention as set forth in claim 9 wherein the alarm means includes a harvester ignition switch, an electrical alarm indicator, and means connecting the alarm indicator to the vacuum switch and ignition for providing a monitor check alarm indication when the ignition switch is turned on and the air flow is below said preselected value.

11. In a cotton harvester having a row unit for removing cotton from plants, a receptacle for receiving harvested cotton, a walled duct extending between the row unit and the receptacle, and an air jet for introducing air into the duct downstream of the row unit to suck cotton from the unit and propel the cotton through the duct downstream to the receptacle, a monitor comprising:
   sensing means positioned at a preselected location in the duct downstream of the air jet location for providing a vacuum signal dependent upon the velocity of the air in the duct at said preselected location;
   means responsive to the vacuum signal for providing an indication of the air velocity in the duct; and
   means for deflecting the cotton away from the sensing means.

12. The invention as set forth in claim 11 wherein the means for deflecting includes an inclined surface extending inwardly from a wall of the duct in the downstream direction to a downstream end offset from the duct wall and adjacent the sensing means, said sensing means including a vacuum opening for providing an aspiration effect, said opening including a rim portion located generally flush with or slightly above the downstream end of the deflecting surface.

13. The invention as set forth in claim 12 wherein the rim portion is located less than approximately 0.1 inch above the downstream end.

14. The invention as set forth in claim 11 wherein the downstream end is offset inwardly on the order of one-half inch from the duct wall.

15. The invention as set forth in claim 11 wherein the means responsive includes a simple vacuum switch having an on and an off condition.

16. The invention as set forth in claim 15 wherein the means responsive further includes an electrical indicator connected to the vacuum switch and responsive to the condition of the switch.

17. The invention as set forth in claim 11 wherein the sensing means is offset downstream of the air jet at least approximately two feet.

18. The invention as set forth in claim 11 wherein the means for deflecting the cotton includes a bend location in the duct.

19. In a cotton harvester having a row unit for removing cotton from plants, a receptacle for receiving harvested cotton, a walled duct extending between the row unit and the receptacle, and an air jet for introducing air into the duct at a location downstream of the row unit to suck cotton from the unit and propel the cotton through the duct downstream to the receptacle, a monitor comprising:
 deflecting means including a surface sloped inwardly into the duct in the downstream direction;
 aspirator means positioned in the duct for providing a vacuum signal dependent upon the velocity of the air in the duct, said aspirator means comprising an opening located adjacent and downstream of the sloped surface, the vacuum signal being dependent on the air velocity over the opening;
 a vacuum switch connected to the aspirator means and responsive to the vacuum signal, said switch having a first state when the vacuum signal corresponds to an air flow above a preselected velocity and a second state when the flow is below said preselected velocity;
 an indicator connected to the vacuum switch for providing an indication of the state of the switch; and
 wherein said monitor further comprises a conduit connecting the opening with the vacuum switch, and wherein the aspirator means and deflecting means are fabricated as a single element, said element including:
 an upper flattened surface projecting above and generally parallel to a wall of the duct in the downstream direction from the sloped surface; and
 a hose barb located generally downstream of the sloped surface and including a conduit-receiving portion in communication with the opening, said opening defined within a rim portion projecting into the duct upwardly from the flattened surface.

20. In a cotton harvester having a row unit for removing cotton from plants, a receptacle for receiving harvested cotton, a walled duct extending between the row unit and the receptacle, and an air jet for introducing air into the duct downstream of the row unit to suck cotton from the unit and propel the cotton through the duct downstream to the receptacle, a monitor comprising:
 aspirator means positioned at a preselected location in the duct for providing a vacuum signal dependent upon the velocity of the air in the duct at said preselected location;
 deflecting means including a surface sloping inwardly into the duct in the downstream direction, said aspirator means comprising an opening located adjacent and downstream of the sloped surface, the vacuum signal being dependent on the air velocity over the opening;
 a vacuum switch connected to the aspirator means and responsive to the vacuum signal, said switch having a first state when the vacuum signal corresponds to an air flow above a preselected velocity and a second state when the air flow is below said preselected velocity; and
 an indicator connected to the vacuum switch for providing an indication of the state of the switch.

21. In a cotton harvester having a row unit for removing cotton from plants, a receptacle for receiving harvested cotton, a walled duct extending between the row unit and the receptacle, and an air jet for introducing air into the duct downstream of the row unit to suck cotton from the unit and propel the cotton through the duct downstream to the receptacle, a monitor comprising:
 aspirator means positioned at a preselected location in the duct for providing a vacuum signal dependent upon the velocity of the air in the duct at said preselected location;
 a vacuum switch connected to the aspirator means and responsive to the vacuum signal, said switch having a first state when the vacuum signal corresponds to an air flow above a preselected velocity and a second state when the flow is below said preselected velocity;
 an indicator connected to the vacuum switch for providing an indication of the state of the switch; and
 wherein the duct includes a bend location downstream of the air jet location and the aspirator means is located adjacent but slightly downstream of the bend location.

* * * * *